UNITED STATES PATENT OFFICE.

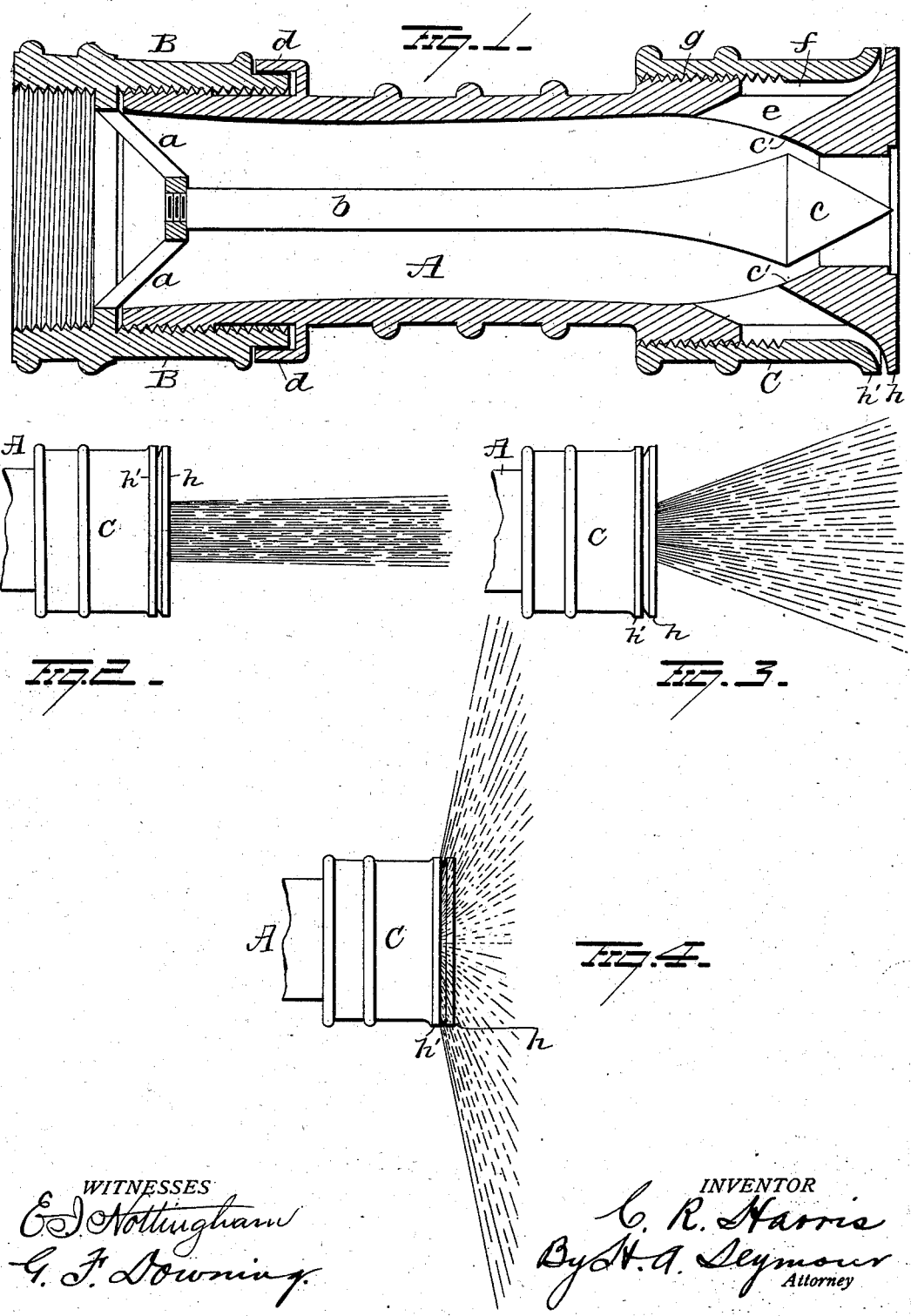

CHARLES R. HARRIS, OF WILLIAMSPORT, PENNSYLVANIA, ASSIGNOR TO THE HARRIS SAFETY COMPANY, OF NEW YORK, N. Y.

NOZZLE.

SPECIFICATION forming part of Letters Patent No. 705,754, dated July 29, 1902.

Application filed October 13, 1899. Renewed November 25, 1901. Serial No. 83,620. (No model.)

*To all whom it may concern:*

Be it known that I, CHARLES R. HARRIS, of Williamsport, in the county of Lycoming and State of Pennsylvania, have invented certain new and useful Improvements in Nozzles; and I do hereby declare the following to be a full, clear, and exact description of the invention, such as will enable others skilled in the art to which it appertains to make and use the same.

My invention relates to an improvement in nozzles for fire-hose; and it consists in the parts and combinations of parts, as will be more fully described, and pointed out in the claims.

In the accompanying drawings, Figure 1 is a view in longitudinal section of my improved nozzle; and Figs. 2, 3, and 4 are views of the free end thereof, showing the shape of the several streams that can be produced by the nozzle.

A represents the body of the nozzle, screw-threaded externally at its lower end and near its upper end for the attachment, respectively, of the screw-coupling B and the sleeve C. The coupling B is designed for attachment to the hose and is provided internally with the integral skeleton frame $a$, carrying the valve-stem $b$. This valve-stem is secured to the frame $a$ by screw-threads, so as to provide for a limited longitudinal adjustment of the stem, and the latter carries at its outer end the conical valve $c$, which latter is designed to more or less close the outlet. The nozzle-outlet is considerably smaller than the bore of the nozzle, and the bore is gradually reduced in size near the outlet end, so as to form a seat $c'$ for the valve. The valve $c$ is preferably integral with the stem and is so located with relation to the outlet end of the nozzle that it may be projected well into the outlet end thereof and cause the water to spread, as shown in Fig. 3, and thus drench a larger surface than a solid stream would, or it may be brought into contact with its seat, and thus shut off the water from the outlet. The valve itself is not moved in order to produce the changes in the shape of the stream of water; but the nozzle is turned in the coupling B and is moved lengthwise with relation to the valve. Hence in order to shut off the stream or change its shape it is simply necessary to turn the nozzle so as to move it lengthwise with relation to the valve.

In order to prevent leakage between the coupling B and the nozzle, I have provided the nozzle with a rearwardly-projecting flange $d$, which overlaps the outer end of the coupling and carries a packing, which rests against the outer face of the coupling.

The nozzle is provided at a point adjacent to its outer edge with a series of forwardly-inclined outlets $e$, all leading to a peripheral groove $f$, formed in the outer face of the nozzle. Mounted on the screw-threads $g$ adjacent to the discharge end of the nozzle is the sleeve C, which latter overhangs the peripheral groove $f$ and partly or wholly closes it. The upper end of the nozzle terminates in an outwardly-projecting lip $h$, concave on its rear side, and the upper end of the sleeve C terminates in a lip $h'$, concave on its outer face. Hence it will be seen that by moving the sleeve until its lip $h'$ is in contact with the lip on the nozzle the spray will be shut off and that by moving the sleeve rearwardly a continuous opening will be formed, through which water will be ejected in a continuous spray, which will operate to shield and protect the firemen handling the hose from the intense heat when fighting a fire at close quarters. This spray can be used for drenching large areas, such as the sides or roofs of houses adjacent to the fire, or for quickly saturating draperies or highly-inflammable goods on fire or in close proximity to the fire, and when not needed can be quickly closed, and thus direct the full stream through the main nozzle.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. The combination with a coupling and an integral skeleton frame within said coupling, of a nozzle threaded and entering said coupling and having a valve-seat near its outlet, a valve-stem secured to the integral frame in the coupling and a valve at the forward end of said stem and adapted to coöperate with said valve-seat.

2. The combination with a coupling, of a nozzle threaded for attachment thereto, a flange on the nozzle and overhanging the end of the coupling, packing disposed between said flange and the outer face of the coupling, and a valve secured to the coupling for controlling the outlet of water when the nozzle is adjusted relatively to the coupling.

3. The combination with a coupling, of a nozzle adjustably attached thereto, said nozzle made in a single piece and having a valve-seat therein near its central outlet and having an exterior annular groove and a series of ducts or outlets communicating at one end with said groove and at the other end with the interior of the nozzle in rear of said valve-seat, an adjustable sleeve on the nozzle for controlling the passage of water through said ducts or outlets and annular groove, and a valve secured to and carried by the coupling and adapted to coöperate with said valve-seat.

In testimony whereof I have signed this specification in the presence of two subscribing witnesses.

CHAS. R. HARRIS.

Witnesses:
ROBERT F. ALLEN,
E. G. WILHELM.